US006970236B1

(12) United States Patent
Markantes et al.

(10) Patent No.: US 6,970,236 B1
(45) Date of Patent: Nov. 29, 2005

(54) METHODS AND SYSTEMS FOR VERIFICATION OF INTERFERENCE DEVICES

(75) Inventors: Charles T. Markantes, Santa Rosa, CA (US); Paul G. Coombs, Santa Rosa, CA (US)

(73) Assignee: JDS Uniphase Corporation, San Jose, CA (US)

( * ) Notice: Subject to any disclaimer, the term of this patent is extended or adjusted under 35 U.S.C. 154(b) by 422 days.

(21) Appl. No.: 10/223,591

(22) Filed: Aug. 19, 2002

(51) Int. Cl.[7] .................................................. G06K 9/78
(52) U.S. Cl. ........................................... 356/71; 283/91
(58) Field of Search ............................ 356/71; 283/72, 283/85, 91, 114; 385/135–138

(56) References Cited

U.S. PATENT DOCUMENTS

| | | | |
|---|---|---|---|
| 3,753,617 | A | 8/1973 | Ehrat |
| 4,183,665 | A | 1/1980 | Iannadrea et al. |
| 4,204,765 | A | 5/1980 | Iannadrea et al. |
| 4,434,010 | A | 2/1984 | Ash |
| 4,592,090 | A | 5/1986 | Curl et al. |
| 4,705,356 | A | 11/1987 | Berning et al. |
| 4,710,627 | A | 12/1987 | Baltes et al. |
| 4,881,268 | A | 11/1989 | Uchida et al. |
| 4,922,109 | A | 5/1990 | Bercovitz et al. |
| 4,930,866 | A | 6/1990 | Berning et al. |
| 5,034,616 | A | 7/1991 | Bercovitz et al. |
| 5,135,812 | A | 8/1992 | Phillips et al. |
| 5,278,590 | A | 1/1994 | Phillips et al. |
| 5,279,403 | A | 1/1994 | Harbaugh et al. |
| 5,295,196 | A | 3/1994 | Raterman et al. |
| 5,308,992 | A | 5/1994 | Crane et al. |
| 5,417,316 | A | 5/1995 | Harbaugh |
| 5,434,427 | A | 7/1995 | Crane et al. |
| 5,483,363 | A | 1/1996 | Holmes et al. |
| 5,498,879 | A | 3/1996 | De Man |
| 5,535,871 | A | 7/1996 | Harbaugh |
| 5,545,885 | A | 8/1996 | Jagielinski |
| 5,552,589 | A | 9/1996 | Smith et al. |
| 5,568,251 | A | 10/1996 | Davies et al. |
| 5,576,825 | A | 11/1996 | Nakajima et al. |
| 5,616,911 | A | 4/1997 | Jagielinski |

(Continued)

FOREIGN PATENT DOCUMENTS

| | | |
|---|---|---|
| DE | 29819954 | 3/1999 |

(Continued)

OTHER PUBLICATIONS

TNO Institute of Applied Physics, "*Banknote Inspection*," Internet Site www.tpd.tno.no/TPD/smartsite151.html, Jul. 20, 1999.

(Continued)

*Primary Examiner*—Zandra V. Smith
*Assistant Examiner*—Kara Geisel
(74) *Attorney, Agent, or Firm*—Allen, Dyer, Doppelt, Milbrath & Gilchrist, P.A.

(57) ABSTRACT

An automated verification system for authenticating an object having an interference security device or feature includes an electromagnetic radiation source capable of generating one or more electromagnetic radiation beams, a transport staging apparatus adapted to position an object in the path of the one or more electromagnetic radiation beams, and an analyzing system adapted to receive the one or more electromagnetic radiation beams from the object and, based upon the characteristics of the received electromagnetic radiation, determine if the object is authentic. The analyzing system is configured to analyze the characteristics of electromagnetic radiation beams at varying angles and/or wavelengths from the object to verify the authenticity of the object. One exemplary method utilizes spectra representative of the electromagnetic radiation received from the object at one or more angles. The slope direction of the spectra is compared against reference data that represents spectra for an authentic object.

47 Claims, 8 Drawing Sheets

U.S. PATENT DOCUMENTS

| | | | |
|---|---|---|---|
| 5,624,019 A | 4/1997 | Furneaux | |
| 5,650,729 A | 7/1997 | Potter | |
| 5,810,146 A | 9/1998 | Harbaugh | |
| 5,816,619 A | 10/1998 | Schaede | |
| 5,832,104 A | 11/1998 | Graves et al. | |
| 5,855,268 A | 1/1999 | Zoladz, Jr. | |
| 5,889,883 A | 3/1999 | Simpkins | |
| 5,892,239 A | 4/1999 | Nagase | |
| 5,903,340 A | 5/1999 | Lanwandy et al. | |
| 5,915,518 A | 6/1999 | Hopwood et al. | |
| 5,918,960 A | 7/1999 | Hopwood et al. | |
| 5,974,150 A * | 10/1999 | Kaish et al. | 283/85 |
| 6,157,489 A | 12/2000 | Bradley, Jr. et al. | |
| 6,172,745 B1 | 1/2001 | Voser et al. | |
| 6,473,165 B1 * | 10/2002 | Coombs et al. | 356/71 |
| 6,570,648 B1 * | 5/2003 | Muller-Rees et al. | 356/71 |

FOREIGN PATENT DOCUMENTS

| | | |
|---|---|---|
| EP | 198819 | 8/1988 |
| WO | WO96/13801 | 5/1996 |
| WO | WO98/12583 | 3/1998 |

OTHER PUBLICATIONS

Money-Handling Equipment, "*Manual Counterfeit Detectors*," Internet-site www.lyndeordway.com/money/detec/electrnc, Jul. 20, 1999.

BellCon I/S "*UV/White Light Conventional Money Tester*," Internet site www.bellcon.dk/page1.htm, Jul. 20, 1999.

Paul G. Coombs and Tom Markantes, "*Improved Verification Methods for OVI™ Security Ink*," In Optical Security and Counterfeit Deterrence Techniques III; Rudolf L. Van Renesse, William A. Vliegenthart, Editors, Proceedings of SPIE vol. 3973 (2000).

S.P. Fisher, R.W. Phillips, M. Nofi, R.G. Slusser, "*Characterization of Optically Variable Film Using Goniospectroscopy*," SPIE vol. 2262, pp. 107-115.

Ardac Incorporated, "AC or DC, Upstack or Downstack, 4-Way Acceptance," Internet site www.ardac.com/dba.htm, Jul. 20, 1999.

* cited by examiner

METHODS AND SYSTEMS FOR VERIFICATION OF INTERFERENCE DEVICES

BACKGROUND OF THE INVENTION

1. The Field of the Invention

The present invention relates generally to methods and systems for determining the authenticity of objects. More particularly, the present invention is related to methods and systems for verifying the authenticity of an item by scanning for a security feature having defined spectral characteristics and analyzing the results.

2. The Relevant Technology

In modern society, various conventional methods are utilized to trade goods and services. However, various individuals or entities wish to circumvent such methods by producing counterfeit goods or currency. In particular, counterfeiting of items such as monetary currency, banknotes, and credit cards is a continual problem. The production of such items is constantly increasing and counterfeiters are becoming more sophisticated, particularly with the recent improvements in technologies such as color printing and copying. In light of this, individuals and business entities desire improved ways to verify the authenticity of goods exchanged and/or currency received. Accordingly, the methods used to prevent counterfeiting through detection of counterfeit articles or objects must increase in sophistication.

Prior verification methods include detection of fluorescent and magnetic materials, pattern or image recognition, and detection of conductive elements. However, computers can duplicate such patterns or images, and fluorescent, magnetic and conductive materials are readily available to counterfeiters.

Conventional methods used to scan currency and other security items to verify their authenticity are described, for example, in U.S. Pat. Nos. 5,915,518 and 5,918,960 to Hopwood et al. The methods described in the Hopwood patents utilize ultraviolet (UV) light sources to detect counterfeit currency or objects. Generally, the tested object is illuminated by UV light and the resultant quantity of reflected UV light is measured by way of two or more photocells. The quantity of UV light reflected from the object is compared against the level of reflected UV light from a reference object. If the reflectance levels are congruent then the tested object is deemed authentic.

The methods in the Hopwood patents are based on the principle that genuine monetary notes are generally made from a specific formulation of unbleached paper, whereas counterfeit notes are generally made from bleached paper. Differentiation between bleached and unbleached paper can be made by viewing the paper under a source of UV radiation. The process of detection can be automated by placing the suspect documents on a scanning stage and utilizing optical detectors and a data analyzing device, with associated data processing circuitry, to measure and compare the detected levels of UV light reflected from the tested document.

Unfortunately, there are many problems with UV reflection and fluorescence detection systems that result in inaccurate comparisons and invalidation of genuine banknotes. For example, if the suspect object or item has been washed, the object can pick up chemicals that fluoresce and may therefore appear to be counterfeit. As a result, each wrongly detected item must, therefore, be hand verified to prevent destruction of a genuine object.

Conventional methods to detect counterfeit objects by using magnetic detection of items that have been embossed or imprinted with magnetic inks are less desirable, since magnetic inks are available to counterfeiters and can be easily applied to counterfeit objects. Other conventional methods using verification of images or patterns on an object can be fooled by counterfeit currency made with color photocopiers or color printers, thereby reducing their anti-counterfeiting effectiveness.

Verification methods that utilize the properties of magnetic detection to detect the electrical resistance of items that have been imprinted with certain transparent conductive compounds are relatively complicated. Such methods require specialized equipment which is not easily available, maintainable, or convenient to operate, particularly for retail establishments or banks that wish to quickly verify the authenticity of an item.

Various items such as banknotes, currency, and credit cards have more recently been imprinted or embossed with optical interference devices such as optically variable inks or foils in order to prevent counterfeiting attempts. Optical interference devices react to light in a unique manner not easily simulated by other materials. For example, the optically variable inks and foils exhibit a color shift or flop that varies with the viewing angle. While these optical interference devices have been effective in deterring counterfeiting, there is still a need for an accurate measuring method to verify that an item is imprinted with an authentic optical interference device, since prior conventional methods are not effective in verifying the presence of optical interference devices.

BRIEF SUMMARY OF THE INVENTION

To aid with the process of verifying the authenticity of an object that should include or is imprinted with an interference device, systems and methods are provided for automatically verifying the authenticity of an object by scanning for the interference security feature and analyzing the data generated by the scan. Various objects such as currency, banknotes, credit cards, and other similar items imprinted or including an interference device can thereby be authenticated.

An exemplary verification system for authenticating an object having an interference security device or feature includes a radiation system, a transport staging apparatus, and an analyzing system. The radiation system includes one or more electromagnetic radiation sources that generate either narrow band or broadband electromagnetic radiation beams. Cooperating with the electromagnetic radiation sources is the transport staging apparatus, which is configured to position the object such that one or more of the electromagnetic radiation beams strike a portion of the object where the interference security device or feature should be located. The analyzing system receives the electromagnetic radiation beams reflected or transmitted from the object and the interference security device or feature, and is configured to analyze the characteristics of the electromagnetic radiation beams reflected or transmitted by the object to verify the authenticity of the object.

Various methods can be employed by the analyzing system to verify the authenticity of an object, such as those which compare the difference between measured spectra associated with the two electromagnetic radiation beams reflected or transmitted at different angles from the object against reference spectra. Suitable verification techniques that can be used, either alone or in combination, include slope-direction matching techniques, slope-matching techniques, color shift comparison technique, peak shift comparison technique, and/or spectral curve fit technique. The verifying methods of the invention are preferably implemented by software models that control the operation of the analyzing system.

In one method for verifying the authenticity of an object according to one embodiment of the present invention, at least one electromagnetic radiation beam at a first incident angle is directed toward an object to be authenticated. The object is positioned so the electromagnetic radiation beam is incident on a portion of the object where an interference security feature should be located. The electromagnetic radiation beam is directed from the object along one or more optical paths, such as by reflection or transmission, and one or more optical characteristics or other characteristics of the electromagnetic radiation beam are analyzed to verify the authenticity of the object.

According to another aspect of the present invention, an analyzing device with associated analyzing module is provided that receives the reflected or transmitted electromagnetic radiation beam(s) from the object to be tested. The analyzing module includes a processing module that compares spectra data for the reflected or transmitted electromagnetic radiation beams(s) against stored reference data for a known, authentic object. Using various comparison techniques, the analyzing module determines whether the measured spectra are the same as the reference spectra. In this manner, the system determines whether or not the tested object is authentic.

These and other aspects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
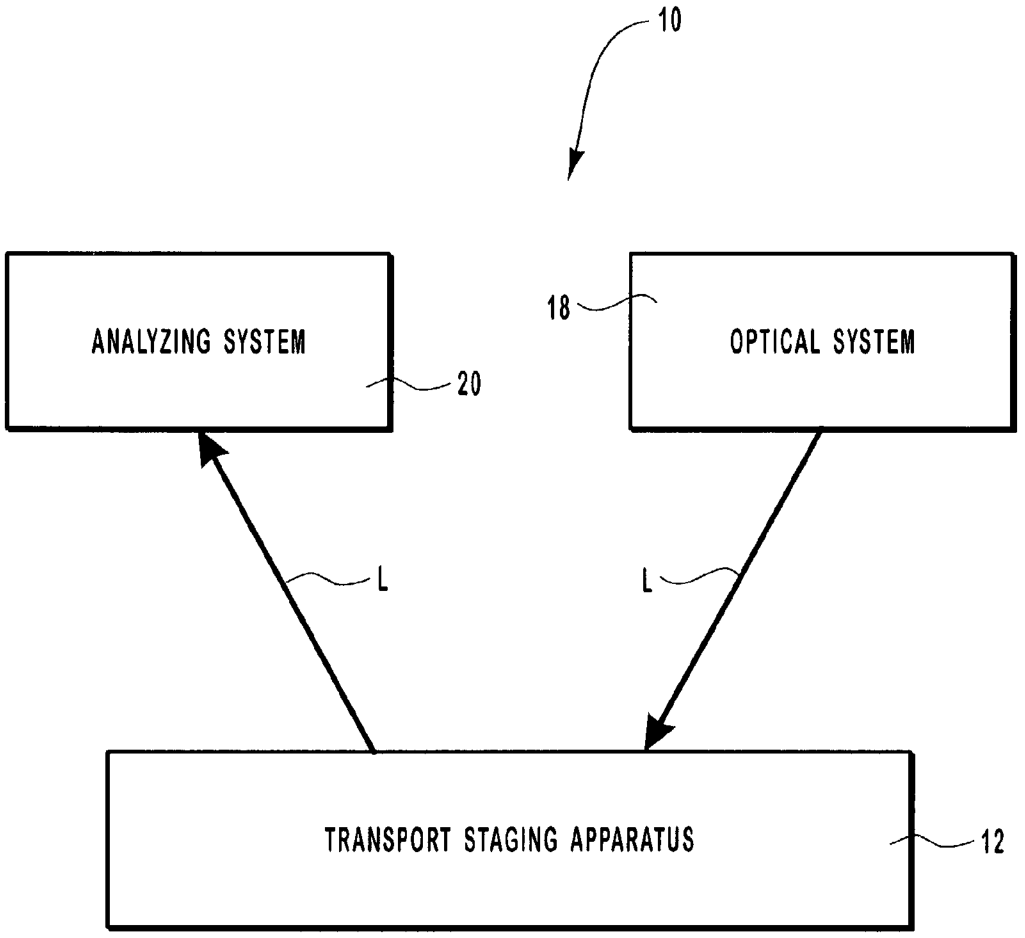
FIG. 1 is a schematic block diagram of an automated verification system that can utilize the methods of the present invention.

The present invention is directed to methods for verifying the authenticity of an object by scanning for an interference security device or feature having identifiable spectral characteristics and analyzing the results to determine authenticity of the object. The invention is particularly useful in testing the authenticity of various objects such as, but not limited to, banknotes, currency, credit cards, or other items that have been imprinted, embossed with, or otherwise include an interference security device or feature.

In one configuration, the interference security device or feature is formed from a color shifting pigment, ink, foil or bulk material. These color shifting pigments, inks, foils, and bulk materials are formed from multi-layer thin film interference coatings that are very complicated to manufacture. As such, it is extremely difficult for counterfeiters to duplicate the effects of such color shifting security devices or features. Additionally, in the case of banknotes and currency, the specific color shifting pigment or ink formulation is available only to legitimate manufacturers and specific governmental agencies, such as the U.S. Treasury. These color shifting pigments and inks exhibit a spectral shift and hence a visual color shift that varies with the viewing angle. The amount of color shift is dependent on the materials used to form the layers of the coating and the thicknesses of each layer. Furthermore, at certain wavelengths the color shifting pigments and inks exhibit the property of higher reflectance with increased viewing angle.

Examples of specific compositions of color shifting pigments or inks which can be utilized in a security device or feature are described in U.S. Pat. Nos. 4,434,010, 4,705,356, 5,135,812, 5,278,590, and 6,157,489, the disclosures of which are incorporated by reference herein. Other suitable color shifting pigments and inks which have magnetic properties are disclosed in co-pending U.S. application Ser. No. 09/844,261, filed on Apr. 27, 2001 and entitled "MULTI-LAYERED MAGNETIC PIGMENTS AND FOILS", the disclosure of which is incorporated by reference herein. Since the optical effects from the color shifting pigments or inks are repeatable and unique for each specific type of coating structure, the resulting color shift, reflectance, and/or transmittance of an authentic security device or feature can be measured and used as a standard or reference to test suspect security devices or features placed on items or objects.

The systems and methods described herein allow for a simple and convenient verification of authenticity by scanning the characteristics, such as spectral reflectance or transmittance, and/or the degree of spectral shift with angle using one or more electromagnetic radiation beams incident upon the security device or feature. The characteristics and/or spectral shifts are compared with stored reference data to verify the authenticity of the security device or feature and hence the object.

Referring to the drawings, where like structures are provided with like reference designations, FIG. 1 is a schematic block diagram showing the general components of an automatic verification system 10 that can utilize the verification methods of the present invention. The verification system 10 generally includes a transport staging apparatus 12 adapted to carry or position an object so that one or more beams of electromagnetic radiation are incident on at least a portion of the object to enable the object to be verified. This transport staging apparatus 12 can be a belt, conveyor, or other device that is capable of performing the function of carrying or positioning an object to be tested during a verification process.

The transport staging apparatus 12 is in optical communication with a radiation system, such as an optical system 18 that generates and directs one or more electromagnetic radiation beams to the object moved by transport staging apparatus 12. Generally, optical system 18 is capable of delivering any type of electromagnetic radiation toward transport staging apparatus 12, wherein or not the radiation is within a visible wavelength.

The transport staging apparatus 12 is also in optical communication with an analyzing system 20 that receives and analyzes at least one reflected or transmitted electromagnetic radiation beam from the object. The optical system 18 includes one or more electromagnetic radiation sources that generate narrow band electromagnetic radiation beams such as monochromatic electromagnetic radiation beams and/or broadband electromagnetic radiation beams. In one configuration, the electromagnetic radiation beams are light beams, while in other configurations beams of any wavelength of electromagnetic radiation may be used with embodiments of the present invention.

Through the cooperation between optical system 18, transport staging apparatus 12, and analyzing system 18, transport staging apparatus 12 positions an object so that one or more of the electromagnetic radiation beams from optical system 18 strike a portion of the object where an interference security device or feature should be located. The analyzing system 20 receives the electromagnetic radiation beams reflected or transmitted from the object and the interference security device or feature and analyzes the optical characteristics of the reflected or transmitted electromagnetic radiation beams to verify the authenticity of the object.

The following description is made with respect to one or more light beams being incident upon an object. It can be understood, however, that similar discussions may be made for any wavelength of electromagnetic radiation directed toward an object. Further, discussion will be made to implementation of the present invention with respect to a security feature. It can be appreciated that similar discussions may be made for a security device.

During the process of authenticating an object, optical system 18 directs at least one light beam L at a first incident angle toward the object to be authenticated. The object is positioned by transport staging apparatus 12 so that the light beam is incident on a portion of the object where an interference security feature should be located. The light beam is reflected or transmitted from the object along one or more optical paths, and one or more optical characteristics of the light beam(s) are analyzed by analyzing system 20 to verify the authenticity of the object.

The methods that can be employed by analyzing system 20 to verify the authenticity of an object can include those methods or techniques that utilize a slope matching technique. This method or technique compares intensity values of electromagnetic radiation reflected or transmitted by the object at a variety of wavelengths with reference intensity values to determine whether or not the object is authentic.

In addition to slope matching techniques, embodiments of the present invention can use a slope-direction matching technique where the direction of the slope of the spectra associated with the detected intensities is compared against reference slope-direction data at the particular wavelengths to determine whether the measured slope-direction matches a reference slope-direction at particular wavelengths. The slope of the spectra at any given wavelength is defined as the change in intensity over the change in the wavelength. Stated another way, the slope of the spectra at any given wavelength is given by $\Delta I/\Delta\lambda$, where I is the intensity of the reflected or transmitted electromagnetic radiation and $\lambda$ is the wavelength the electromagnetic radiation. This equation produces a value that is either positive or negative. The slope-direction matching technique compares these positive and negative values against positive and negative values associated with reference spectra to determine the authenticity of the interference security feature. The positive value identifies a slope of the spectra as increasing, while a negative value identifies a slope as decreasing. This slope-direction matching technique can optionally be combined with other methods or techniques that compare (i.e. spectral difference between two light beams reflected or transmitted at different angles from the object against a reference spectral shift, and those which compare the spectral shape of at least one light beam reflected or transmitted from the object against a reference spectral shape. Therefore, the slope-matching or slope-direction matching techniques can be optionally combined with one or more of a color shift comparison techniques, a peak shift comparison techniques, a spectral curve fit techniques, and a spectral curve slope match techniques.

Figure 2:
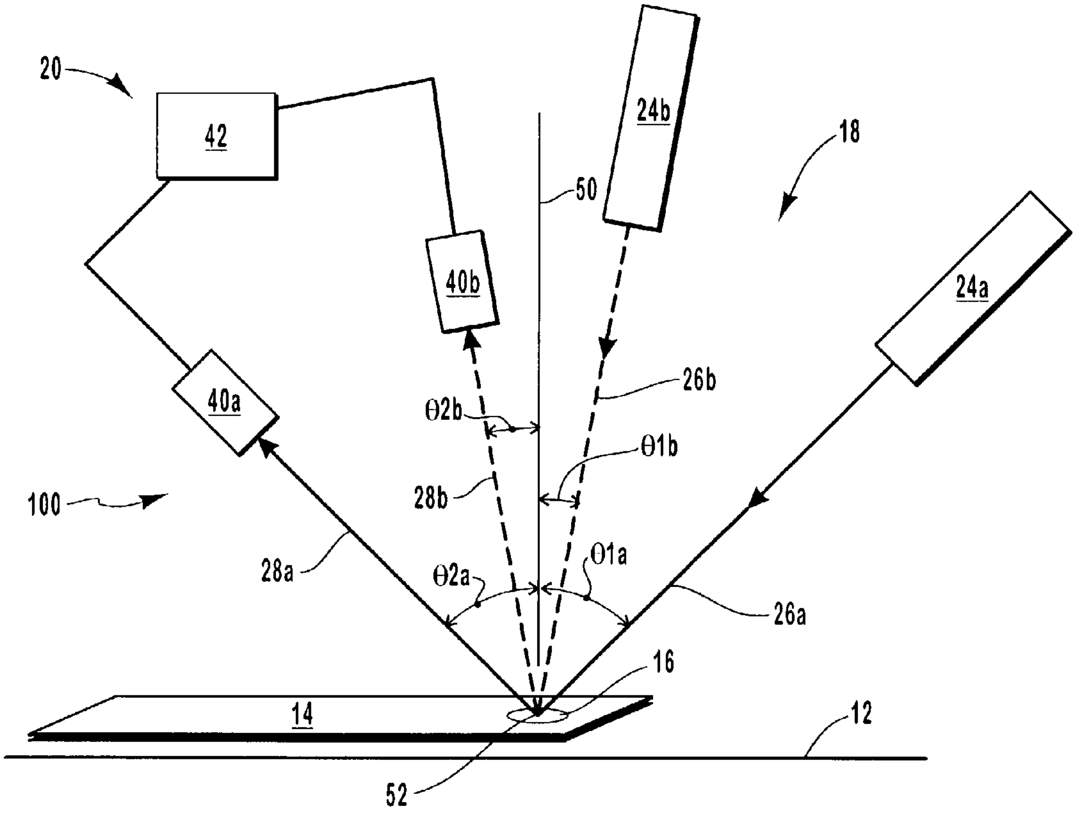
FIG. 2 is a schematic depiction of one embodiment of an automated verification system that can utilize the methods of the present invention.

FIG. 2 is a schematic depiction of a verification system 100 in accordance with one embodiment that can utilize the methods of the invention to validate the authenticity of an object that should include an interference security feature. Although reference is made herein to one specific verification system, one skilled in the art can identify various other configurations of verification system to perform the desired methods. For instance, those verification systems described in co-pending U.S. application Ser. No. 09/489,453, filed Jan. 21, 2000, and entitled "Automated Verification Systems and Methods for Use with Optical Interference Devices," the disclosure of which is incorporated herein by this reference.

The verification system 100 is configured to scan and analyze an interference security feature 16 on an object 14 to verify its authenticity. The security feature 16 can take the form of various interference devices, such as optically variable inks, pigments, or foils including color shifting inks, pigments, or foils; bulk materials such as plastics; cholesteric liquid crystals; dichroic inks, pigments, or foils; interference mica inks or pigments; goniochromatic inks, pigments or foils; diffractive surfaces, holographic surfaces, or prismatic surfaces; or any other interference device, such as but not limited to optical interference device, which can be applied to the surface of an object for authentication purposes.

The object 14 on which security feature 16 is applied can be selected from a variety of items for which authentication is desirable, such as security documents, security labels, banknotes, monetary currency, negotiable notes, stock certificates, bonds such as bank or government bonds, commercial paper, credit cards, bank cards, financial transaction cards, passports and visas, immigration cards, license cards, identification cards and badges, commercial goods, product tags, merchandise packaging, certificates of authenticity, as well as various paper, plastic, or glass products, and the like.

The verification system 100, as depicted in FIG. 2, includes a transport staging apparatus 12 for carrying object

14 to be authenticated, an optical system 18 for illuminating object 14, and an analyzing system 20 for analyzing the features of a reflectance spectrum in this particular exemplary embodiment. Generally, system 100 verifies the authenticity of security feature 16 by comparing the reflectance spectra of security feature 16 at two different reflection angles $\theta_{2a}$ and $\theta_{2b}$ and against stored reference data indicative of reflective spectra. Alternatively, the system can utilize reflectance and/or transmittance spectras.

The transport staging apparatus 12 of verification system 100 can include numerous configurations for performing the desired transporting and positioning functions. For example, transport staging apparatus 12 can include a belt or conveyor that carries and/or holds object 14 in the required orientation during the authentication process and moves object 14 in a linear fashion past optical system 18. Such a belt or conveyer may be deployed in either a high speed or low speed configuration to provide continuous verification of multiple objects, items or articles. In another configuration, transport staging apparatus 12 provides for stationary positioning of an object 14 in verification system 10. The transport staging apparatus 12 is one structure capable of performing the function of means for positioning an object. Various other structures may also function as a transporting and positioning means, and are known by those skilled in the art.

The optical system 18 of verification system 100 has two or more light sources such as broadband light sources 24*a*, 24*b*. The light sources 24*a*, 24*b* generate light in a range of wavelengths, such as from about 350 nm to about 1000 nm, to illuminate in a collimated fashion security feature 16 located on object 14. Suitable devices for light sources 24*a*, 24*b* include tungsten filaments, quartz halogen lamps, neon flash lamps, and broadband light emitting diodes (LED). It can be appreciated that system 10 may be modified to include only one light source 24, for example, by including a mirror and a beam splitter or by using bifurcated fibers fed from a common or single source. Alternatively, the light sources used can generate monochromatic and collimated light beams such as from laser devices.

The light sources 24*a*, 24*b* respectively generate a first beam 26*a* and a second beam 26*b* that are transmitted to an intersection point 52 at differing incident angles $\theta_{1a}$ and $\theta_{1b}$ with respect to a normal 50. Alternatively, first beam 26*a* and second beam 26*b* may be transmitted to different spots that do not intersect. Instead, beams 26*a*, 26*b* focus upon two separate spots that lie upon the longitudinal axis of transport staging apparatus 12 which object 14 passes along. In this configuration, beams 26*a*, 26*b* need not be activated and deactivated in sequence, but rather beams 26*a*, 26*b* may be continuously activated.

Light beams 26*a*, 26*b* are directed from security feature 16 along two different optical paths having angles $\theta_{2a}$ and $\theta_{2b}$, respectively, toward analyzing system 20, as defined by beams 28*a*, 28*b*. As depicted, beams 28*a*, 28*b* are reflected from security feature 16, however, it may be appreciated that the optical paths may include transmitted beams. While the discussion herein will refer to reflectance angles, it should be understood that a similar discussion could be made with respect to transmittance angles.

The analyzing system 20 of verification system 100 includes a first optical detector 40*a* and a second optical detector 40*b* that are operatively connected to a data analyzing device 42. The detectors 40*a*, 40*b* are preferably spectrophotometers or spectrographs. The detectors 40*a*, 40*b* are used to measure the magnitude of the reflectance as a function of wavelength for the security feature being analyzed. The detectors 40*a*, 40*b* measure the intensity of the light reflected from security feature 16 on object 14 over a range of wavelengths. Each detector 40*a*, 40*b* detects light reflected at a different angle, so that system 100 can detect reflected light at two different angles.

Based upon the detected intensities, analyzing device 42 and/or detectors 40*a*, 40*b* of analyzing system 20 generate reflectance spectra for the light reflected from the object for each reflection angle. The detectors 40*a*, 40*b* may include, for example, a linear variable filter (LVF) mounted to a linear diode array or charge coupled device (CCD) array. The LVF is an example of a family of optical devices called spectrometers that separate and analyze the spectral components of light. The linear diode array is an example of a family of photodetectors that transduce a spatially varying dispersion beam of light into electrical signals that are commonly displayed as pixels. Together, the spectrometer and the photodetector comprise a spectral analyzing device called a spectrophotometer or spectrograph. It can be appreciated, therefore, that various other spectrometer and photodetector combinations and configurations may be used to obtain the desired reflectance data.

The detector 40*a* is configured to receive light beam 28*a* reflected at a reflection angle $\theta_{2a}$ that is preferably close to incident angle $\theta_{1a}$, while detector 40*b* is configured to receive light beam 28*b* reflected at a reflection angle $\theta_{2b}$ that is preferably close to incident angle $\theta_{1b}$. As such, detectors 40*a*, 40*b* are each configured at a particular angular orientation that corresponds to the respective reflection angle of the light received by the detector. As shown in FIG. 2, detector 40*a* is at a greater angular orientation than detector 40*b*, although this need not be the case.

Communicating with detectors 40*a*, 40*b* is data analyzing device 42. Data analyzing device 42 processes the data received from detectors 40*a*, 40*b* and compares this measured data with stored reference data to verify the authenticity of the security feature. Each detector 40*a*, 40*b* measures the reflectance over a range of wavelengths to generate measured data that can be used by data analyzing device 42 and/or detectors 40*a*, 40*b* to create a spectral curve for each light beam 28*a*, 28*b* reflected at angles $\theta_{2a}$ and $\theta_{2b}$, respectively. The data analyzing device 42 uses various hardware and software components and modules to analyze spectral curve and/or the measured data, compare the same as a whole or at individual wavelengths against stored reference data, and therefore verify the authenticity of security feature 16.

For example, data analyzing device 42 can use software to compare the measured data and/or the spectral curve based upon such data measured with reference data and/or spectra stored in a database of analyzing system 20. If the features of the measured data and/or spectra, such as but not limited to the particular slope or slope-direction of the spectra at particular wavelengths, substantially coincide with the feature of reference data and/or spectra, then the item is deemed to be genuine. Therefore, data analyzing device 42 may indicate to a user whether the tested object is authentic or potentially counterfeit. As with detectors 40*a*, 40*b*, there are various types of data analyzing devices known to those skilled in the art that are capable of performing the desired function, such as application specific logic devices, microprocessors, or computers.

Illustratively, the analyzing device can be embodied in a computer device, such as but not limited to a special purpose computer or a general purpose computer including various computer hardware modules. An exemplary configuration of a computer device capable of performing the functions of the analyzing device is illustrated in FIG. 3.

Figure 3:
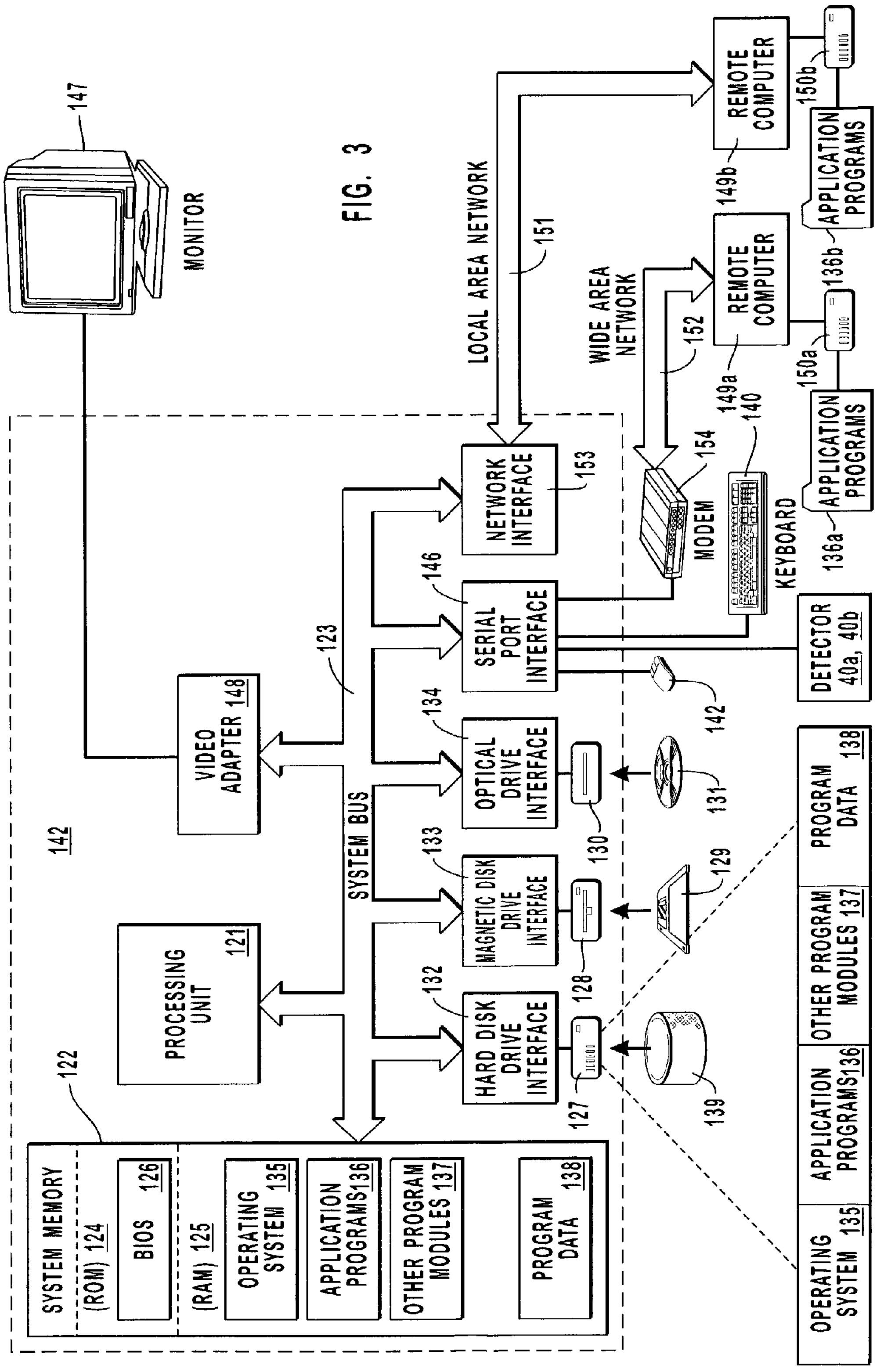
FIG. 3 is a schematic representation of one embodiment of the data-analyzing device of the present invention.

FIG. 3 and the following discussion are intended to provide a brief, general description of a suitable computing environment in which the functions of the analyzing device may be implemented. Although not required, the functions of the analyzing device will be described in the general context of computer-executable instructions, such as program modules, being executed by one or more computers that may optionally be operating in a network environment. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the functions of the data analyzing device may be practiced in network computing environments with many types of computer system configurations, including personal computers, hand-held devices, multi-processor systems, microprocessor-based or programmable consumer electronics, network PCs, minicomputers, mainframe computers, and the like. The functions of the data analyzing device may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 3, an exemplary representation of data analyzing device includes a general purpose computing device in the form of a data analyzing device 42, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within data analyzing device 42, such as during start-up, may be stored in ROM 124.

The data analyzing device 42 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for data analyzing device 42. Although the exemplary data analyzing device described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 139, magnetic disk 129, optical disk 131, ROM 124 or RAM 125, including an operating system 135, one or more application programs 136, other program modules 137, and program data 138, such as but not limited to the reference data used for comparison against the measured reflectance or transmittance data of the scanned object. A user may enter commands and information into data analyzing device 42 through keyboard 140, pointing device 142, or other input devices (not shown), such as a microphone, joy stick, game pad, satellite dish, scanner, or the like. In addition to these input devices, the data analyzing device can receive data inputs from detectors 40*a*, 40*b* through serial port interface 146. These and other input devices are often connected to processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The data analyzing device 42 may operate in a networked environment using logical connections to one or more remote computers, such as remote computers 149*a* and 149*b*. Remote computers 149*a* and 149*b* may each be another personal computer, a server, a router, a network PC, a peer device or other common network node, and typically include many or all of the elements described above relative to data analyzing device 42, although only memory storage devices 150*a* and 150*b* and their associated application programs 136*a* and 136*b* have been illustrated in FIG. 3. The logical connections depicted in FIG. 3 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, data analyzing device 42 is connected to the local network 151 through a network interface or adapter 153. When used in a WAN networking environment, data analyzing device 42 may include a modem 154, a wireless link, or other means for establishing communications over wide area network 152, such as the Internet. The modem 154, which may be internal or external, is connected to system bus 123 via serial port interface 146. In a networked environment, program modules depicted relative to data analyzing device 42, or portions thereof, may be stored in the remote memory storage device. It will be appreciated that the network connections shown are exemplary and other means of establishing communications over wide area network 152 may be used.

Figure 5:
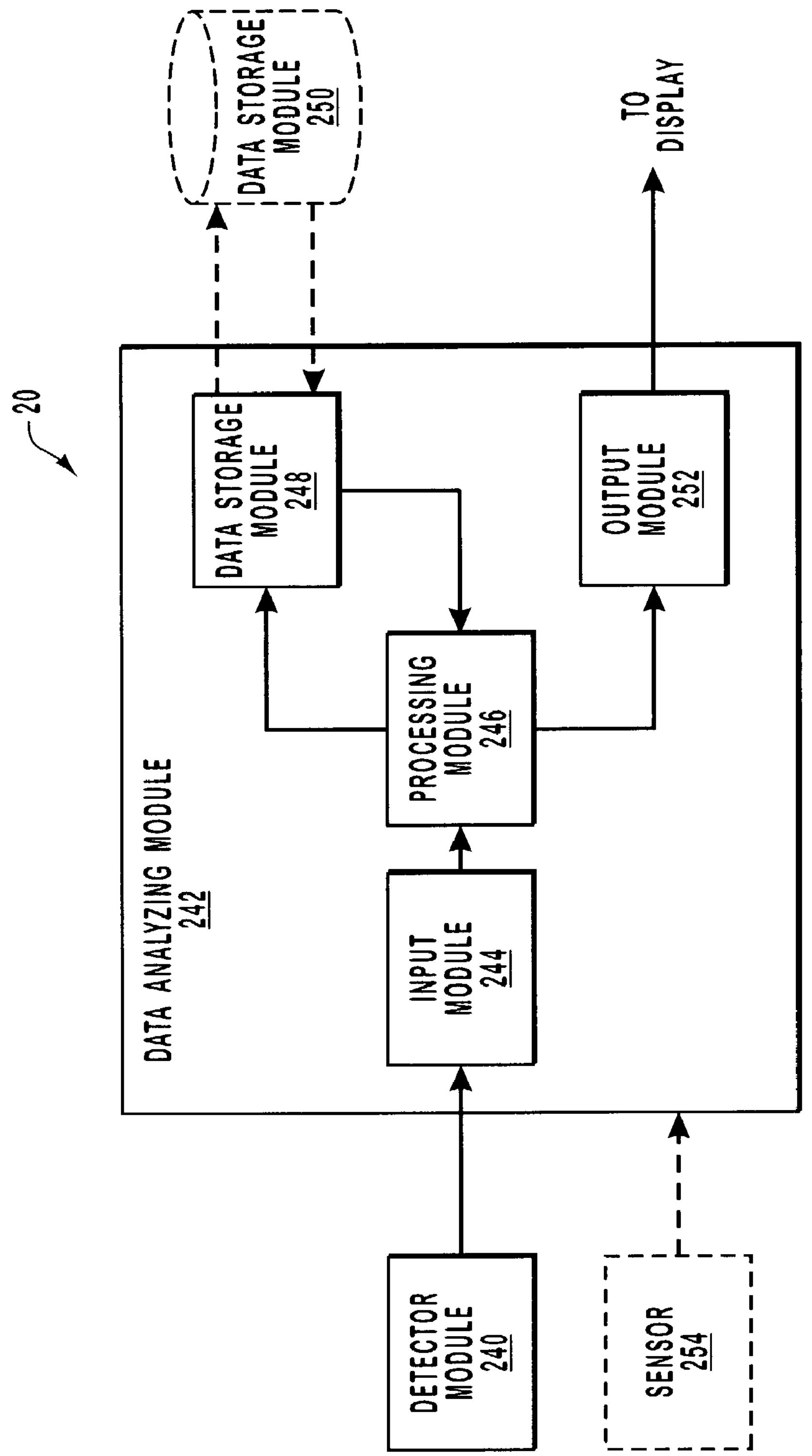
FIG. 5 is a schematic representation of a data-analyzing module associated with the data-analyzing device of FIG. 3.

Referring now to FIG. 5, depicted is a schematic representation of illustrative software modules associated with analyzing system 20. As illustrated, analyzing system 20 includes a detector module 240 and a data analyzing module 242. The structures and functions of detectors 40*a*, 40*n* and analyzing device 42 apply to detector module 240 and data analyzing module 242.

The data analyzing module 242 includes an input module 244 that is adapted to receive signals representative of detected or reflected intensities for particular wavelengths of the electromagnetic radiation reflected from optical security feature 16 of object 14 (FIG. 2). Although reference is made to input module 244 being adapted to receive reflected intensities, in alternate embodiments input module 244 is adapted to receive signals indicating or representative of transmitted intensities.

The input module 244 is configured to gather the measured data from detector module 240 and deliver the same to a processing module 246. Optionally, input module 244 can manipulate the measured data representative of the detected intensities before delivering the same to processing module 246.

Processing module 246 receives the data representative of the measured data and/or spectra for electromagnetic radiation reflected from interference security feature 16 of object 14 at reflection angles $\theta_{1a}$ and $\theta_{1b}$. Using this data, processing module 46 retrieves reference data for the specific object 14 from data storage module 248. Data storage module 248 can be a database with an appropriate front end. Alternatively, data storage module 248 can communicate with additional data-storages module 250, as illustrated in dotted lines, to receive the reference data requested by processing module 246. For instance, data storage module 250 can be accessed by a wide area network, a local area network, the Internet, or some other network architecture. Data storage module 248 can have various configurations so long as capable of performing the function of storing reference data in a form accessible by processing module 246.

Upon receiving the reference data from data storage 248 and/or data storage module 250, processing module 246 compares the measured data and/or spectra against the stored reference data and/or spectra. This comparison can be achieved using a variety of different techniques, such as but not limited to slope-direction matching techniques, slope-matching techniques, color shifting comparisons, peak shifting comparisons, or combinations thereof.

Once processing module 246 has completed its analysis, it delivers data indicative of whether the measured data and/or spectra matches the stored reference data and/or spectra. Such indication can be based upon percentage accuracy, or alternatively can be an express indication of whether or not the object is authentic. For instance, processing module 246 can deliver data indicating a percentage authenticity of an object to an output module 252, which subsequently presents visual representations of such percentage authenticity through a display device, such as but not limited to display device 147. The display of the information, such as percentage authenticity, can be in a graphical form, numerical form, audible form, or combinations thereof. Alternatively, output module 252 can illuminate one or more liquid crystal displays (LCDs) that indicate a percentage authenticity of the object. For instance, output module 252 can illuminate a number of LCDs to indicate the percentage authenticity.

In another configuration, the data or signals delivered from processing module 246 to output module 252 can be in the form of an express indication of authenticity. For instance, output module 252, upon receiving the appropriate signal from processing module 246, can illuminate a green LCD to indicate the object is authentic or illuminate a red LCD to indicate that the object is not authentic.

Although reference is made to specific manners to indicate to a user of system 100 that an object is authentic or not, various other manners are known to those skilled in the art in light of the teaching contained herein. For instance, indications of authenticity can be achieved through any combination of audio indications, visual indications, or combinations thereof.

Returning to FIG. 2, in operation of verification system 100, object 14 such as a banknote that has been affixed with security feature 16, is placed upon transport staging apparatus 12. The electromagnetic radiation sources 24*a*, 24*b*, such as light sources, generate light beams 26*a*, 26*b* respectively that are directed to be incident upon intersection point 52 on the surface transport staging apparatus 12. The object 14 is moved in a linear fashion through intersection point 52, such that security feature 16 passes linearly through intersection point 52. Since object 14 moves past intersection point 52, verification system 10 has the ability to scan a line-shaped area of security feature 16 rather than a spot. The light beams 28*a*, 28*b* reflected from security feature 16 are incident upon detectors 40*a*, 40*b*, which simultaneously measure the reflectance at the two different reflection angles $\theta_{2a}$ and $\theta_{2b}$, respectively, yielding the reflectance spectrum at each angle.

As the angle of incident light on security feature 16 is varied, the peak and trough wavelengths in a reflectance vs. wavelength profile changes. This provides a contrast between the low and high reflectance spectral features (i.e., peaks and troughs) produced by security feature 16, which is used by verification system 100 to determine the authenticity of security feature 16.

Figure 4:
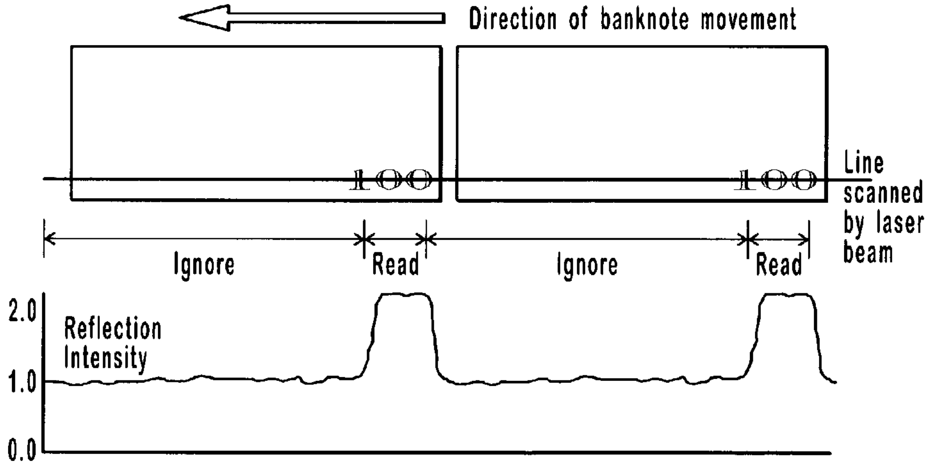
FIG. 4 is a graphical representation of the reflection intensity as a function of position on a banknote imprinted with an interference security device or feature.

FIG. 4 depicts schematically a typical plot of reflection intensity as a function of linear position on a scanned item such as a banknote imprinted with a security feature. Such a plot further represents a component of the reflection data detected by detectors 40*a*, 40*b* and data analyzing device 42 as the banknote passes through intersection point 52 in system 100. As shown in FIG. 4, a change in the reflection intensity, which is usually an increase, occurs at the location of the security feature on the banknote. If specific features of the measured spectra substantially coincide with the features of the reference spectra, then the item is deemed genuine. For instance, data analyzing device 42 can compare the slope or the slope-direction of the reflectance spectra identified by each detector 40*a*, 40*b* at various wavelengths against reference slope-direction data stored within program data 138 or other portion of data analyzing device 42.

Various other suitable verification systems that can incorporate the verification methods of the present invention are described in a co-pending U.S. patent application, Ser. No. 09/489,453 filed on Jan. 21, 2000, the disclosure of which is incorporated herein by reference.

In general, the verification method of the invention analyzes data generated when an object is scanned by a suitable verification system so that electromagnetic radiation reflected or transmitted from a security feature, such as an optical interference device (OID) is detected by one or more detectors and analyzed by an analyzing device and associated data analyzing module. The reflectance values across a wavelength range, i.e., reflectance spectra, are stored, whether in permanent or temporary storage, values indicating the direction of the slope of the spectra at particular wavelengths identified, and such slope-direction data compared to reference slope-direction data of a known authentic OID. A decision is then made as to the authenticity of the document and appropriate action is taken.

Figure 6:
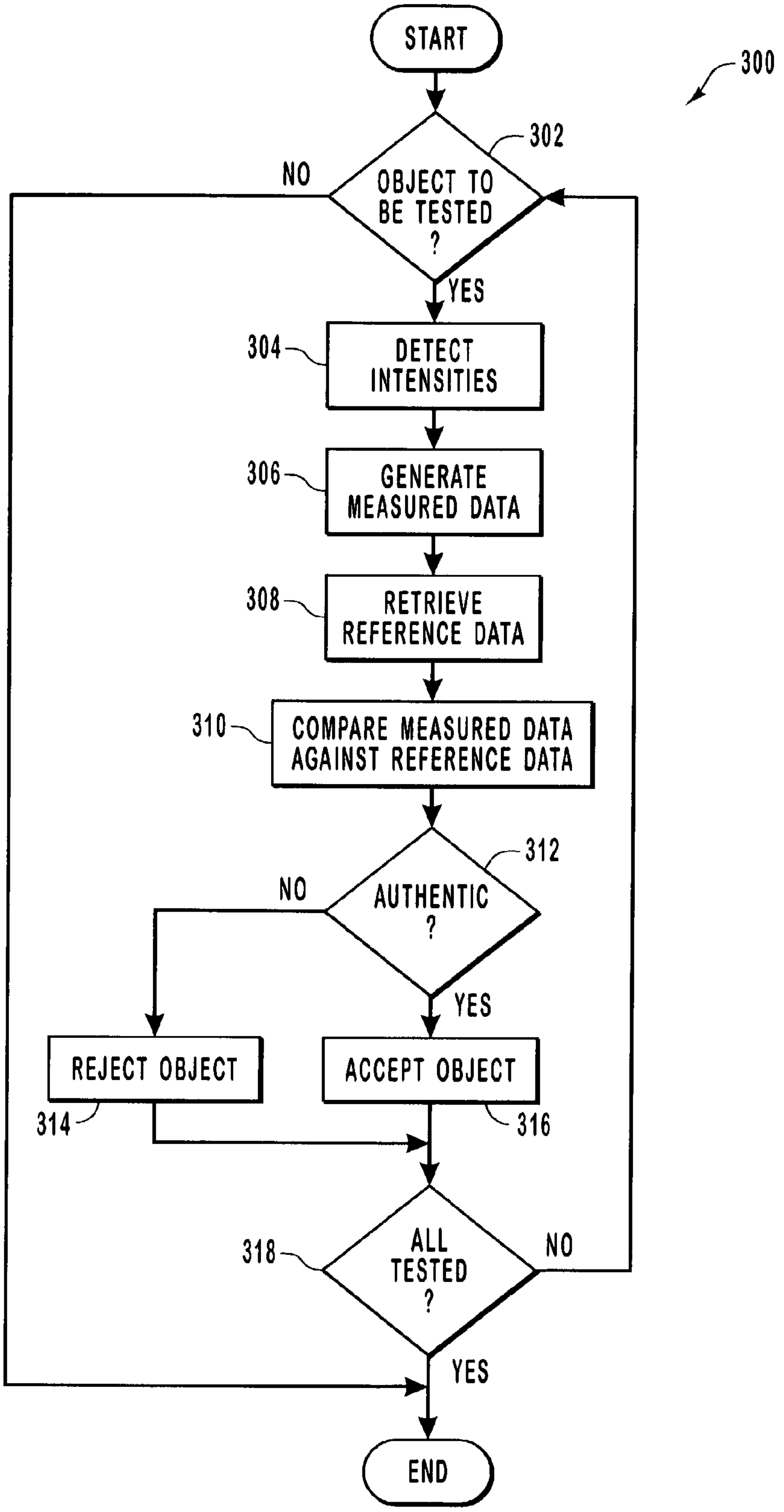
FIG. 6 is a logic flow diagram illustrating a software control algorithm for the verification method of the present invention.

In FIG. 6, a flow diagram is depicted that illustrates a portion of the verification method of the present invention. As illustrated, initially, as represented by block 302, it is first determined whether an object is to be tested. This may include identification by data analyzing device 42 or data analyzing module 242 that an object is located on transport staging apparatus 12 (FIG. 1). Alternatively, this may occur through activation of one or more input devices associated with data analyzing device 42 and/or data analyzing module 242. If the response to the decision block 302 is in the affirmative, system 100 detects the intensities associated with the object to be tested, as represented by block 304. Detection of the intensities can include detection of reflectance intensities and/or transmittance intensities. As discussed above, these intensities indicate particular optical characteristics of the security feature that should be associated with the object. Following detecting the intensities of the object, data representative of the detected intensities is generated as represented by block 306. The measured data can be generated by detectors 40*a*, 40*b*, or alternatively can be generated by data analyzing device 42 and/or data analyzing 242. In either case, the measured data represents a reflection spectra and/or transmittance spectra for the object being tested by the system of the present invention.

Once the measured data has been generated, referenced data associated with the particular object to be tested is retrieved from data storage module 248, data storage module 250, and/or other hardware and software modules associated with data analyzing device 42 and/or data analyzing module 242. For instance, data analyzing device 42 and/or data analyzing module 242 can be configured for a specific type of optical interference feature that should be associated with a particular object. For example, the data analyzing device and/or data analyzing module can be configured to test for an interference security feature upon a monetary instrument, currency, credit cards, or any of the other types of objects. Alternatively, the data analyzing device and/or data analyzing module can be modified for use with one or more different security features and/or one or more different objects through inputting one or more parameters through input module 244 (FIG. 5) or some other input module associated with the data analyzing module of the present invention. The parameters that can be input and subsequently stored in a data storage module associated with the data analyzing module include, but are not limited to, the angle of each electromagnetic radiation beam incident upon the interference security device or feature, the angle of each detector module with respect to the interference security device or feature, the number of electromagnetic radiation sources, the manner of collecting reflected or transmitted electromagnetic radiation, the wavelength range of electromagnetic radiation collected, and the technique to be used to determine authenticity. Consequently, when data analyzing device and/or data analyzing module retrieves the referenced data, the particular data to be retrieved would be based upon the particular object and security feature that is to be scanned for on the object.

Following retrieval of the reference data, the reference data and measured data are compared to determine whether the security feature is authentic, as represented by block 310. The process of comparing the measured data against the reference data can be performed in a variety of different ways using a variety of different techniques, such as but not limited to slope-matching technique, slope-direction matching technique, color shifting technique, peak shifting technique, spectral perfect technique, or combinations thereof. Illustrative descriptions of these methods are provided hereinafter.

When the object is identified as being authentic, such as when decision block 312 is in the affirmative, the object is accepted by system 100, as represented by block 316. Alternatively, when decision block 312 is in the negative, the object will be rejected and system 100 will indicate that the object is rejected, as represented by block 314.

Following authentication of a first object, the system is configured to identify whether additional objects are to be verified, as represented by decision block 318. This can occur through use of sensors 254 (FIG. 5) associated with transport staging apparatus 18 that identify when additional objects are located on apparatus 18 or otherwise accessible by apparatus 18. The sensors 254 can be mechanical sensors, electrical sensors, optical sensors, or any other sensor that is capable of detecting the presence of an object to be tested by system 100. This sensor can provide a signal to analyzing system 20 that additional objects are available or accessible. When additional objects are to be verified, the above-discussed steps are performed for all subsequent objects and associated security features.

Although reference is made to one illustrative method for performing the verification process described herein, one skilled in the art can appreciate that one or more of the indicated blocks may be eliminated and additional blocks can be included to perform the desired function. Further, the particular order of performing the desired functions is only illustrative of one particular manner to perform the method, it being understood that the order of the particular method steps can be performed in a variety of different ways. For instance, and not by way of limitation, retrieval of the reference data can be performed before intensities are detected. Similarly, retrieval of the data can be performed at the same time as intensities are detected and/or the measured data generated. Further, identification of additional objects to be tested can be performed at the same time as a first object has been or is being determined to be authentic or not.

In addition to the above, it can be understood that additional method steps can be included within the flow of activities or actions to be taken by system 100 and/or data analyzing device or data analyzing module. For instance, when system 100 is capable of being modified for particular objects and security features, a method can include initially generating or defining parameters of use for the system, such as defining a particular angle at which the light is to be detected and particular angles at which the light is to be directed towards the object or security feature, the particular comparison technique used to determine whether the object and/or security feature is authentic, whether detectors receive reflected or transmitted electromagnetic radiation, changes in the wavelength of the electromagnetic radiation reflected and/or transmitted from the object and/or security feature, combinations thereof, or any other parameter that will affect the manner by which reflected and/or transmitted electromagnetic radiation is delivered, detected, and analyzed to determine whether an object and associated security feature is authentic.

As mentioned above, various verification techniques can be employed during the step of comparing the reference data against the measured data. Such techniques include slope-direction matching technique, slope match technique, color shift comparison, peak shift comparison, and spectral curve fit, which can be used alone or in various combinations.

The slope-direction matching technique or method of the invention utilizes a series of conditions or "gates" to determine whether the measured data or spectra are authentic. These conditions or gates define a relationship between intensity values at two or more wavelengths. For instance, the conditions or gates defined whether the reflectance or transmittance should increase or decrease in the region between the wavelengths for a reference authentic OID. If the direction of a reflectance or transmittance change indicated by the measured data coincides with a reference authentic OID, then that particular condition or gate has been passed. In one embodiment, all conditions or gates must be passed for verification of the OID. In alternate embodiments, a defined percentage of conditions or gates must be passed before the OID will be identified as being authentic.

Figure 7:
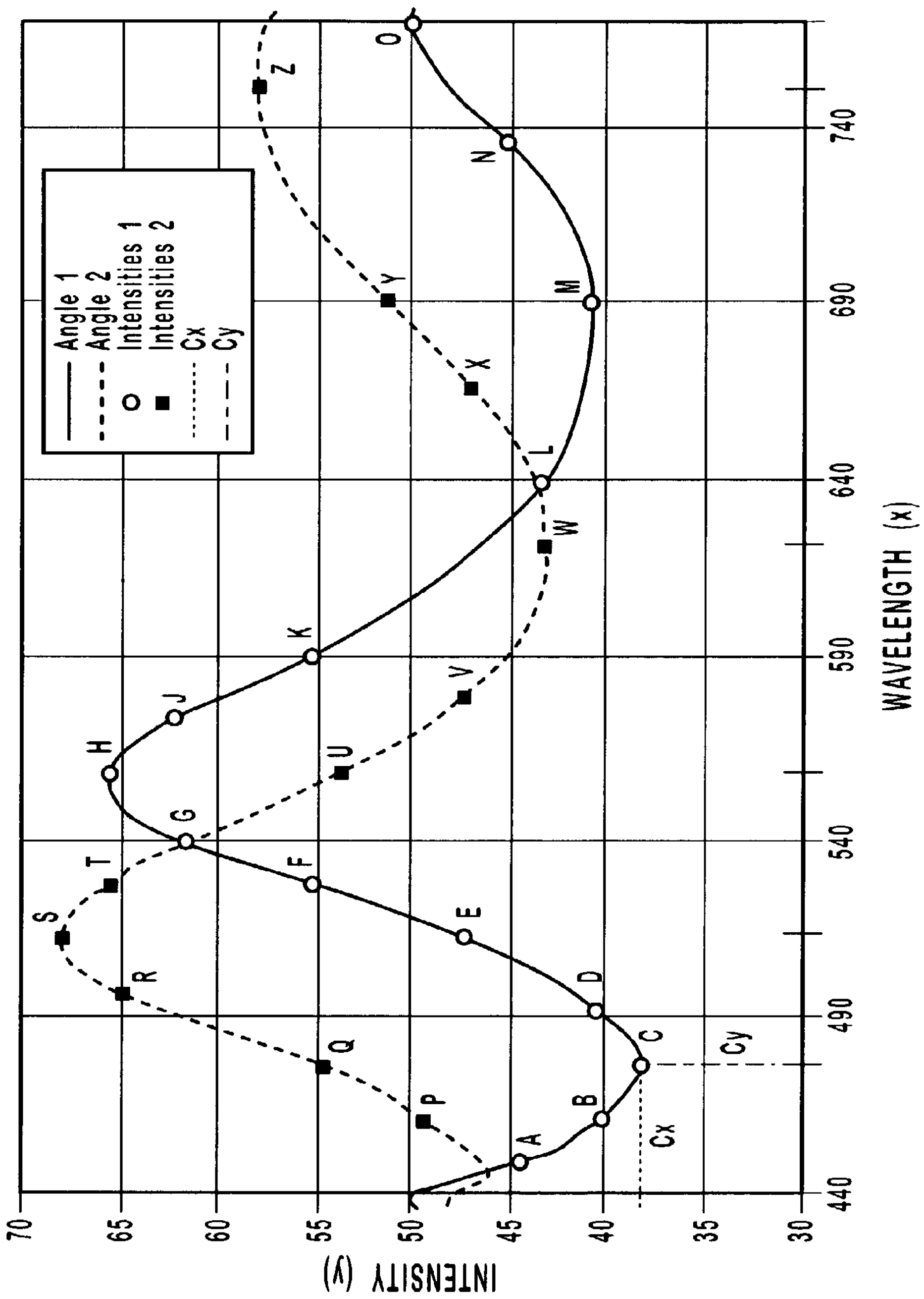
FIG. 7 is a spectral graph showing reflection intensity as a function of wavelength at two angles of view for an interference device or feature.
Figure 8:
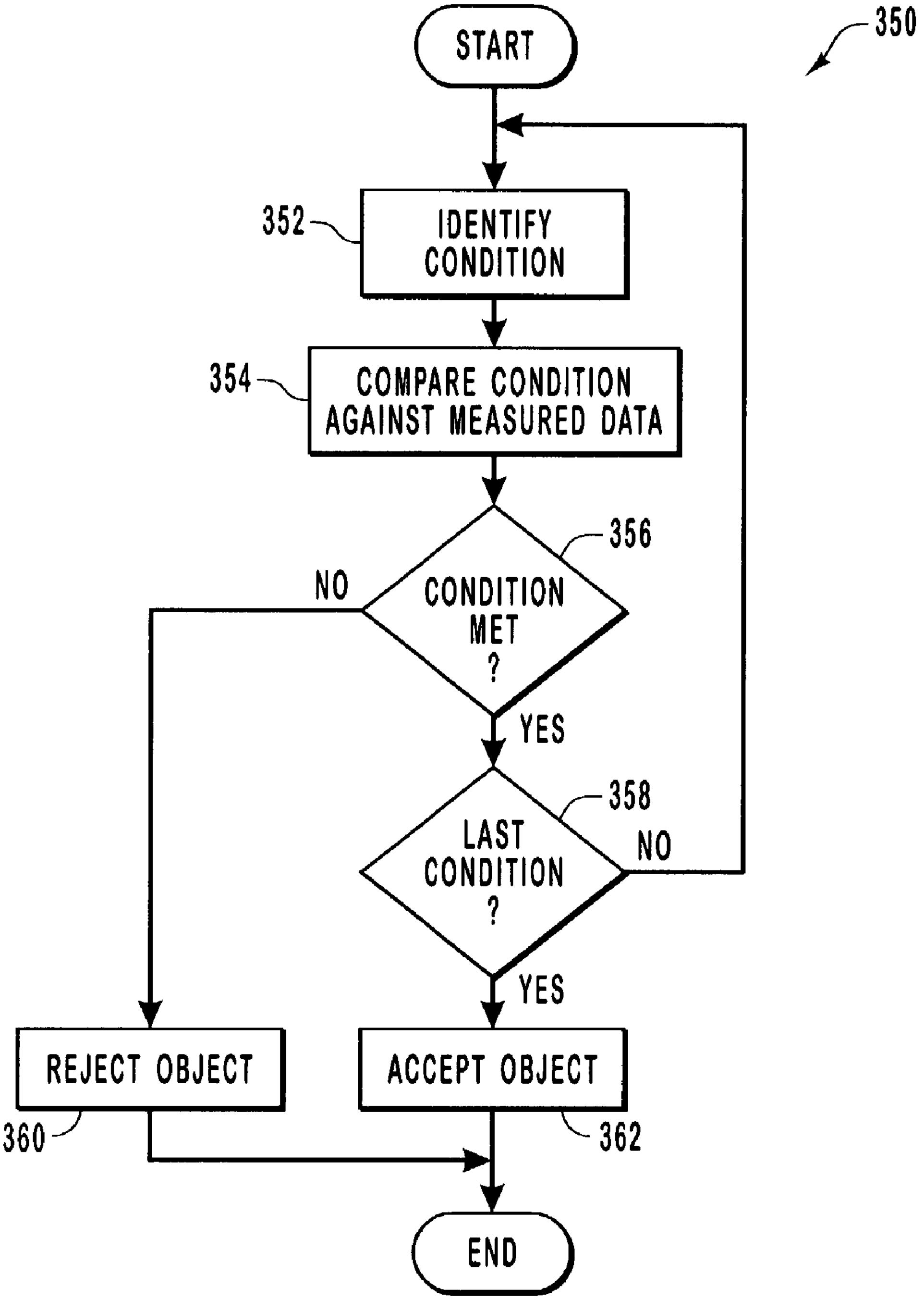
FIG. 8 is a flow diagram representation of a slope-direction matching method of one embodiment of the present invention.

FIG. 7 is a spectral graph showing reflection intensity as a function of wavelength at two angles of view (angles 1 and 2) for an interference device that can be verified using the slope-direction matching technique or method. Various comparison points are indicated on the graph, including points A through O for angle 1, and points P through Z for angle 2. In addition, two sets of parameters are established for measurement at each of angles 1 and 2, respectively, which are indicated in the graph at the comparison points by the symbols O and □. In performing this method, and with reference to FIG. 8, the results of a scan are analyzed by comparing the reflected intensities at predetermined wavelengths with reflected intensities for a reference. In this particular case, this comparison is achieved by determining whether the reflected intensities fulfill a number of conditions that are known to be met by an authentic object. When, in this exemplary embodiment, all the conditions are met, the object is identified as being authentic. For instance, as illustrated in FIG. 8, initially a condition is identified, as represented by block 352. This condition or some other logical condition must be met by the measured data associated with the reflected intensities of the object and associated security feature. An illustrative list of conditions is included in Table 1, where the intensity of the reflected electromagnetic radiation, designated by the letter I, at a given wavelength or reference point, indicated by the subscript, is compared with the intensity of the reflected electromagnetic radiation at a second wavelength or reference point.

TABLE 1

| Angle 1 | Angle 2 |
|---|---|
| $I_A > I_B$ | $I_P < I_Q$ |
| $I_B > I_C$ | $I_Q < I_R$ |
| $I_C < I_D$ | $I_R < I_S$ |
| $I_D < I_E$ | $I_S > I_T$ |
| $I_E < I_F$ | $I_T > I_U$ |
| $I_F < I_G$ | $I_U > I_V$ |
| $I_G < I_H$ | $I_V > I_W$ |
| $I_H > I_J$ | $I_W < I_X$ |
| $I_J > I_K$ | $I_X < I_Y$ |
| $I_K > I_L$ | $I_Y < I_Z$ |
| $I_L > I_M$ | — |
| $I_M < I_N$ | — |
| $I_N < I_O$ | — |

Once a condition is identified, the measured data or spectrum is analyzed to determine if the identified condition is met by the measured data, as represented by block 354. Illustratively, and with reference to FIG. 7, the intensity values for points A and B are compared to determine whether A has a greater intensity value than B. If the result of this comparison is true, such that decision block 356 is positive, then it is determined whether this condition is the last condition to be tested for a particular scanned object. For our illustrative example, this would not be the case and consequently another condition is identified and subsequently analyzed by filing blocks 352–358. In the event that the tested condition is not met, the object is rejected, as represented by block 360. In the event that all conditions have been met, as represented by decision block 358 being affirmative, the object is accepted, as represented by block 362.

As mentioned above, another method used to determine the authentication of an object is a color-shift comparison method or technique. In this method or technique, the reflected color from an OID can be measured at two angles by the systems and modules of the present invention. The change in color at each angle is calculated and compared to a known value of a genuine OID, which has a known color shift when the viewing angle is changed by a known amount by data analyzing module 42 or more generally, analyzing system 20. The metric for color could be hue angle, or a combination of hue, chroma, and lightness; or other appropriate color values could be utilized. For example, a red-to-green OID might go from a hue of 0 degrees to a hue of 180 degrees when the viewing angle changes from 0 degrees to 60 degrees. The measured hue values at two or more angles for a tested OID are compared to the stored hue values of a genuine OID. The tested OID is considered genuine only if the hues at all angles match.

In the peak shift comparison method, the spectra of a genuine OID is first obtained under specified conditions of incident electromagnetic radiation and incident and/or reflected or transmitted and angles. The locations of the peaks and valleys in reflectance (or transmission) are stored as the standard reference for that item. The spectral peak(s) are then found for the OID test sample at two angles. The location of these peaks and the separation between them are compared to the reference data and judged. The OID test sample is considered genuine if its peak and valley location wavelengths match those of the standard reference. In the graph of FIG. 7 for example, those wavelengths are the x-components of points C, H, M, O, S, W, and Z, i.e., Cx, Hx, Mx, Ox, Sx, Wx and Zx respectively.

With the spectral curve fit method, the overall closeness of the match between the measure data or spectra and the reference data or spectra is calculated. One way this can be done is to compute the sum of the squares of the difference between the reference data or spectra at a first angle and the measured data or spectra at the first angle. This can then be repeated for a second angle, third angle, and so on. The results are then combined into a single metric. The value of the metric is then compared to an acceptable range of values for the particular OID.

In the spectral curve-slope match method of the invention, reflection or transmission spectra are obtained at two or more angles from a scanned OID. The slopes of the spectral curves are computed at pre-selected points along the curves. A calculation is performed on these slope values and a validation factor is generated. The validation factor is then compared to an acceptable range of values for the particular OID. One implementation of the spectral curve slope match method includes the steps of: 1) choosing slope pairs for a genuine OID; 2) computing the slope for each pair; 3) subtracting each slope from zero to get an adjustment constant for that pair; 4) for a test item, compute the slope for each pair, add the corresponding adjustment constant, and take the absolute value; and 5) the validation factor is the sum of the values in step 4. The closer the validation factor is to zero, the higher is the confidence that the OID is genuine.

Another verification technique that can be utilized in the present invention is the reflectance ratio method, which compares a reflectance value at one viewing angle to the reflectance value at another angle for a particular wavelength. The reflectance ratio is compared with a reference reflection ratio for a known authentic security device to determine authenticity. For example, referring to FIG. 7, example ratios for comparison could be Cy/Qy<1 or Hy/Uy>1 reflectance intensity at point C/reflectance intensity at point Q<1 or reflectance intensity at point H/reflectance intensity at point U>1. The measured spectral shift is compared to the reference spectral shift by determining a reflectance intensity ratio of first and second light beams at different angular orientations, which is compared with a stored reference reflectance ratio at one or more wavelengths.

A further verification method that can be utilized in the present invention is the maximum/minimum technique, which is similar to the peak shift comparison method discussed previously, except that a comparison is made to calculated theoretical wavelengths in the maximum/minimum technique instead of the comparison being made against scans of actual genuine articles. In an OID, there is a great contrast between the high and low reflectance spectral features, i.e., peaks and troughs. Additionally, the spacing of the peaks and troughs, and their respective wavelengths, is predictable and repeatable, such that the spectral shape or profile of each security feature can serve as a "fingerprint" of the physical structure of the optical interference device. For example, in a five layer multi-layer thin film interference device having the design metal$_1$-dielectric-metal$_2$-dielectric-metal$_1$ ($M_1DM_2DM_1$), the peaks (H) and troughs (L) have wavelengths that are related through the following mathematical formulae set forth in Table 2.

TABLE 2

| Trough (L) | Peak (H) |
|---|---|
| $\lambda_{L1} \cong$ Quarter Wave Optical Thickness (QWOT) | $\lambda_{H1} \cong \lambda_{L1}/2$ |
| $\lambda_{L2} \cong \lambda_{L1}/3$ | $\lambda_{H2} \cong \lambda_{L1}/4$ |
| $\lambda_{L3} \cong \lambda_{L1}/5$ | $\lambda_{H3} \cong \lambda_{L1}/6$ |
| $\lambda_{L4} \cong \lambda_{L1}/7$ | $\lambda_{H4} \cong \lambda_{L1}/8$ |
| $\lambda_{L5} \cong \lambda_{L1}/9$ | |

By knowing the quarter wave optical thickness of the authentic security device and the above ratios, it is possible to calculate the wavelengths of maximum reflectance ($\lambda_{max}$) and the wavelengths of minimum reflectance ($\lambda_{min}$) of the security device (e.g., of the design $M_1DM_2DM_1$). Further, by measuring the reflectance (or transmittance) spectrum of the item to be tested, one can determine the measured values for $\lambda_{max}$ and $\lambda_{min}$. Then by comparing the measured values of $\lambda_{max}$ and $\lambda_{min}$ with the values predicted by the formulae, the authenticity of the item being tested can be determined.

As noted previously, each of the above verification techniques can be used either alone or in combination one with another to authenticate a security feature and associated object scanned by the system of the present invention. Illustratively, the slope-direction matching technique can be used with one or more of the other techniques described herein. Similarly, the slope matching technique can be used with one or more of the other techniques described herein. It should be noted by one skilled in the art, therefore, that various techniques can be used to perform the desired authentication process.

Figure 9:
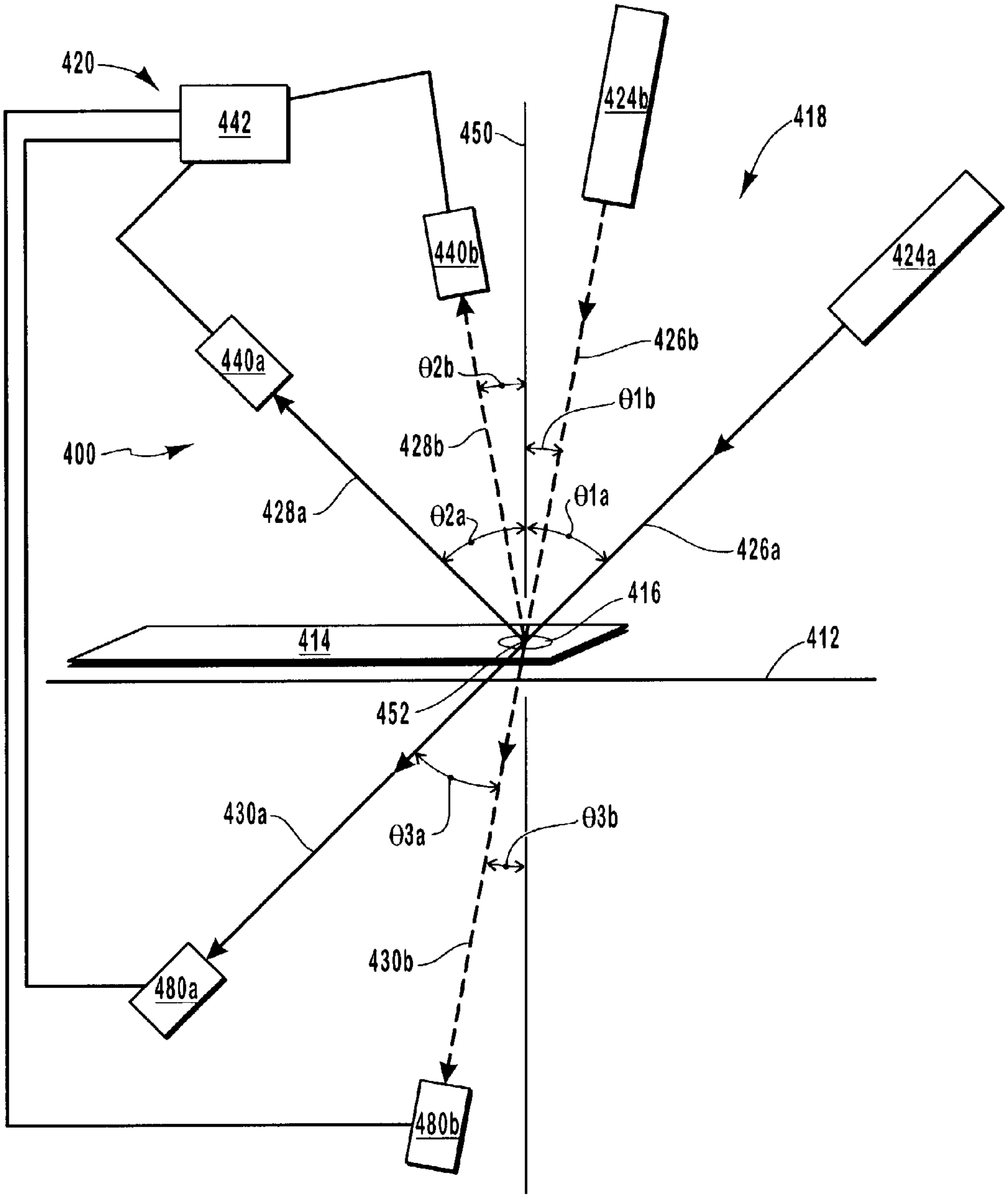
FIG. 9 is a schematic depiction of another embodiment of an automated verification system that can utilize the methods of the present invention.

FIG. 9 is a schematic depiction of another automated verification system 400 in accordance with another embodiment of the present invention. The system 400 can utilize the methods of the invention to validate the authenticity of an object that should include an interference security feature.

The discussion related to system 100, and the various components thereof are applicable to the discussion of system 400. The verification system 400, as depicted in FIG. 9, includes a transport staging apparatus 412 for carrying an object 414 to be authenticated, an optical system 418 for illuminating object 414, and an analyzing system 420 for analyzing the features of both a reflectance and a transmittance spectrum. Generally, system 400 verifies the authenticity of a dichroic security feature 416 on object 414 by comparing the reflectance and transmittance spectra of dichroic security feature 416 at one or more angles.

The optical system 418 of verification system 400 can have two or more light sources such as broadband light sources 424*a*, 424*b*. The light sources 424*a*, 424*b* generate light in a range of wavelengths, such as from about 350 nm to about 1000 nm, to illuminate in a collimated fashion dichroic security feature 416 located on object 414. The light sources 424*a*, 424*b* respectively generate a first beam 426*a* and a second beam 426*b* that are transmitted to an intersection point 452 at differing incident angles $\theta_{1a}$ and $\theta_{1b}$ with respect to a normal 450. Alternatively, first beam 426*a* and second beam 426*b* may be transmitted to different spots that do not intersect. Instead, beams 426*a*, 426*b* focus upon two separate spots that lie upon the longitudinal axis of transport staging apparatus 412 which object 414 passes along. In this configuration, beams 426*a*, 426*b* need not be activated and deactivated in sequence, but rather beams 426*a*, 426*b* may be continuously activated.

Reflected portions of light beams 426*a* and 426*b*, defined by beam portions 428*a* and 428*b*, are directed from dichroic security feature 416 along two different optical paths having angles $\theta_{2a}$ and $\theta_{2b}$, respectively, toward a pair of optical detectors 40*a* and 40*b* above the plane of object 414. The optical detectors 40*a* and 40*b* are operatively connected to a data analyzing device 442 of analyzing system 420. Transmitted portions of light beams 26*a* and 26*b*, defined by beam portions 30*a* and 30*b*, are transmitted through dichroic security feature 416 along two different optical paths having angles $\theta_{3a}$ and $\theta_{3b}$, respectively, toward a pair of optical detectors 480*a* and 480*b* below the plane of object 414. The optical detectors 480*a* and 480*b* are operatively connected to data analyzing device 442 of analyzing system 420. The data analyzing device 442 processes the data received from detectors 440*a*, 440*b* and detectors 480*a*, 480*b*, and compares the same with stored reference data to verify the authenticity of dichroic security feature 416, such as through using one or more of the verification techniques described herein. For example, and not by way of limitation, slope-direction matching, slope matching, or other techniques.

The security feature 416 utilizes an optical interference device (OID) with dichroic properties. Hence, the transmitted spectrum at a given angle is related to the reflected spectrum at the same angle. In an ideal dichroic device, there is no absorption or scatter, and the reflectance at any wavelength and angle is equal to unity minus the transmittance at the same wavelength and angle. An example of a suitable optical interference device for security feature 416 includes a blue-yellow dichroic device. At a normal angle of incidence, this dichroic device reflects wavelengths between about 400 nm and about 520 nm and appears blue in reflection. At the same normal angle of incidence, the blue-yellow dichroic device transmits wavelengths between about 520 nm and about 700 nm and appears yellow in transmission. The transition or "cuton" wavelength of a dichroic OID is a function of the incident angle. The transition shifts towards shorter wavelengths as the incident angle increases. Hence, at a 60 degree incident angle, the transition of the blue-yellow dichroic device occurs at 500 nm instead of 520 nm.

Analyzing system 420 can verify the authenticity of dichroic security feature 116 by several different methods. For example, the reflectance and transmittance spectra at one or more angles can be compared to stored reference spectra using the slope-direction match or slope matching technique. Also, the reflectance and transmittance spectra corresponding to incident angle $\theta_{1a}$ can be compared to the reflectance and transmittance spectra corresponding to incident angle $\theta_{1b}$ using the peak shift method. If the optical interference device is a dichroic device with low levels of absorption and scatter, then the reflectance and transmittance spectra at a given angle can be added together and checked against the formula Reflectance (Rλ)+Transmittance (TX) =1 to verify authenticity of the dichroic device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for verifying the authenticity of an object, the method comprising:

collecting spectral data from a position on an object to be authenticated where an interference security feature should be located;

retrieving reference data for a genuine interference security feature, said reference data indicating a plurality of conditions to be met by said spectral data for the object to be identified as being authentic; and comparing said spectral data against said reference data to determine the authenticity of the object.

2. The method as recited in claim 1, wherein retrieving reference data comprises retrieving a plurality of logical operation conditions.

3. The method as recited in claim 1, wherein collecting spectral data comprises detecting at least one reflected electromagnetic radiation beam from the object.

4. The method as recited in claim 1, wherein collecting spectral data comprises detecting at least one transmitted electromagnetic radiation beam from the object.

5. The method as recited in claim 1, wherein collecting spectral data comprises detecting at least one reflected electromagnetic radiation beam and at least one transmitted electromagnetic radiation beam from the object.

6. The method as recited in claim 1, wherein said reference data comprises data indicating a plurality of points on a reference spectrum.

7. The method as recited in claim 1, wherein comparing said spectral data further comprises:

identifying a first wavelength for said spectral data;

accessing a first condition of said reference data, said first condition associated with said first wavelength; and comparing said first condition with said spectral data at said first wavelength.

8. The method as recited in claim 1, wherein comparing said spectral data comprises:

identifying a slope-direction of a spectra associated with said spectral data for each of a plurality of wavelengths;

accessing said reference data to identify a reference slope-direction for each of said plurality of wavelengths; and comparing each said slope-direction against each said reference slope-direction for each of said plurality of wavelengths.

9. The method as recited in claim 1, wherein comparing said spectral data comprises:

identifying a plurality of slope-directions of a spectra associated with said spectral data, each of said plurality of slope-directions being associated with a defined wavelengths;

accessing said reference data to identify a plurality of reference slope-directions, each of said plurality of reference slope-directions being associated with said defined wavelengths; and comparing, for a first wavelength of said plurality of wavelengths, a first slope direction of said plurality of slope-directions against a first reference slope-direction of said plurality of reference slope-directions, wherein when said first slope-direction is different from said first reference slope-direction said objected is not authentic.

10. The method as recited in claim 1, wherein comparing said spectral data comprises using one or more techniques selected from the group consisting of, spectral curve slope matching, color shift comparison, peak shift comparison, spectral curve fit technique, or combinations thereof.

11. The method as recited in claim 1, wherein comparing said spectral data comprises using techniques selected from the group consisting of reflectance ratio, max/min technique, or combinations thereof.

12. A computer program product for implementing, in a system that includes at least one processor and is configured to scan an object to determine the authenticity of the object, a method for verifying the authenticity of the object, the computer program product comprising:

a computer readable medium carrying computer executable instructions for implementing the method, the computer executable instructions, when executed, performing:

a step for collecting spectral data from a position on an object where an interference security feature should be located;

a step for retrieving reference data for a genuine interference security feature, said reference data indicating a plurality of conditions to be meet for the object to be identified as being authentic; and a step for testing at least one of said plurality of conditions against said spectral data to determine the authenticity of the object.

13. The method as recited in claim 12, wherein said step for collecting spectral data comprises a step for detecting at least one of at least one reflected electromagnetic radiation beam from the object and at least one transmitted electromagnetic radiation beam from the object.

14. The method as recited in claim 12, wherein said step for collecting spectral data comprises detecting at a first detector module a first light beam reflected from the object at a first reflected angle and detecting at a second detector module a second light beam reflected from the object as a second reflected angle.

15. The method as recited in claim 14, further comprising generating first spectral data for said first light beam and second spectral data for said second light beam.

16. The method as recited in claim 15, wherein said step for testing comprises a step for testing at least one of said plurality of conditions against said first spectral data and said second spectral data to determine the authenticity of the object.

17. The method as recited in claim 12, wherein said step for retrieving reference data comprises retrieving a plurality of logical operation conditions from a data storage module.

18. The methods as recited in claim 17, further comprising a step for accessing a remote data storage module to retrieve said plurality of logical operation conditions.

19. The method as recited in claim 12, wherein said step for collecting spectra data comprises defining a plurality of points associated with a spectra for the intensity of electromagnetic radiation reflected from the object.

20. The method as recited in claim 12, wherein said step for collecting spectra data comprises defining a plurality of points associated with a spectra for the intensity of electromagnetic radiation transmitted from the object.

21. The method as recited in claim 12, further comprising testing said spectral data using one or more techniques selected from the group consisting of, spectral curve slope matching, color shift comparison, peak shift comparison, spectral curve fit technique, or combinations thereof.

22. The method as recited in claim 12, further comprising testing said spectral data using techniques selected from the group consisting of reflectance ratio, max/min technique, or combinations thereof.

23. The method as recited in claim 12, wherein said step for testing at least one of said plurality of conditions further comprises:

a step for identifying a first intensity value for a first wavelength of said spectral data and a second intensity value for a second wavelength of said spectral data;

a step for accessing a first condition of said reference data, said first condition defining a defined relationship between said first intensity value and said second intensity value; and a step for determining, at a processor module, whether a relationship between said first intensity value and said second intensity value matches said defined relationship associated with said reference data.

24. The method as recited in claim 12, wherein testing at least one of said plurality of conditions further comprises:

a step for identifying a slope-direction between a first point of said spectral data at a first wavelength of a electromagnetic radiation beam reflected from the object and a second point of said spectral data at said first wavelength of said electromagnetic radiation beam reflected from the object a step for accessing said reference data to identify a reference slope-direction between a first reference point of said reference data at said first wavelength and a second reference point of said reference data as said second wavelength; and a step for comparing said slope-direction against said reference slope-direction, wherein when said slope-direction is different from said reference slope-direction the object is not authentic.

25. In a system for testing the authenticity of an object, a computer-readable medium having computer-executable instructions comprising:

a detector module configured to detect intensities of electromagnetic radiation received from a position on an object where a security feature should be located, said detected intensities defining a measured spectra;

a data storage module configured to store reference intensities of electromagnetic radiation for an authentic security feature, said reference intensities defining a reference spectra; and a processor module cooperating with said detector module and said data storage module, said processor module being adapted to compare said measured spectra against said reference spectra on a wavelength by wavelength bases to determine whether a measured slope-direction of said measured spectra at two or more wavelengths matches a reference slope-direction of said reference data.

26. The system as recited in claim 25, further comprising an input module adapted to receive said detected intensities of the electromagnetic radiation.

27. The system as recited in claim 25, further comprising a plurality of detector modules, each of said plurality of detector modules being adapted to receive electromagnetic radiation from the object at different angles.

28. The system as recited in claim 27, wherein each of said plurality of detector modules receives either reflected electromagnetic radiation or transmitted electromagnetic radiation.

29. The system as recited in claim 25, wherein said data storage module is remote from said processor module.

30. The system as recited in claim 25, wherein said data storage module and said processor module form part of a data analyzing module.

31. The system as recited in claim 25, wherein said processor module is further configured to compare said measured spectra against said reference spectra using a technique selected from the group consisting of, spectral curve slope matching, color shift comparison, peak shift comparison, spectral curve fit technique, reflectance ratio, max/min technique, or combinations thereof.

32. The system as recited in claim 31, wherein said processor module is further adapted to receive one or more parameters, said one or more parameters defining said technique to use to compare said measure spectra and said reference spectra.

33. The system as recited in claim 32, wherein said one or more parameters are further selected from the group consisting of the angle of electromagnetic radiation beams incident upon the interference security feature, the angle of said detector module with respect to the interference security feature, the number of electromagnetic radiation sources, the number of said detector modules, the type of electromagnetic radiation sources, the collection of reflected or transmitted electromagnetic radiation, and the wavelength range of electromagnetic radiation collected.

34. The system as recited in claim 25, further comprising an output module adapted to indicate the authenticity of the object to a user of the system.

35. The system as recited in claim 25, wherein said processor module is adapted to compare said measured spectra against said reference spectra using a technique selected from the group consisting of color shift comparison, peak shift comparison, spectral curve fit, or combinations thereof.

36. The system as recited in claim 25, wherein said processor module is adapted to compare said measured spectra against said reference spectra using a technique selected from the group consisting of reflectance ratio, max/min technique, or combinations thereof.

37. A system for verifying the authenticity of an object, comprising:

means for directing a first light beam at a first incident angle and a second light beam at a second incident angle toward an object to be authenticated;

means for positioning the object such that said first and second light beams are incident on a portion of the object where an interference security feature should be located; and means for analyzing one or more optical characteristics of said first light beam directed from the object along at least a first optical path and said second light beam directed from the object along at least a second optical path to verify the authenticity of the object, said means for analyzing including a computer-readable medium having computer-executable instructions for implementing the method, the computer-executable instructions, when executed, performing:

a step for collecting spectral data from a position on the object to be authenticated where the interference security feature should be located;

a step for retrieving reference data for a genuine interference security feature, said reference data indicating a plurality of conditions to be meet by said spectral data for the object to be identified as being authentic; and a step for comparing said spectral data against said reference data to determine the authenticity of the object.

38. The system as recited in claim 37, wherein said step for retrieving further comprises a step for retrieving a plurality of logical operation conditions.

39. The system as recited in claim 37, wherein said step for collecting spectral data further comprises a step for detecting at least one reflected electromagnetic radiation beam from the object.

40. The system as recited in claim 37, wherein said step for collecting spectral data further comprises a step for detecting at least one transmitted electromagnetic radiation beam from the object.

41. The system as recited in claim 37, wherein said step for collecting spectral data further comprises a step for detecting at least one reflected electromagnetic radiation beam and at least one transmitted electromagnetic radiation beam from the object.

42. The system as recited in claim 37, wherein said step for comparing said spectral data further comprises:

a step for identifying a first wavelength for said spectral data;

a step for accessing a first condition of said reference data, said first condition associated with said first wavelength; and a step for comparing said first condition with said spectral data at said first wavelength.

43. The system as recited in claim 37, wherein said step for comparing said spectral data comprises:

a step for identifying a slope-direction of a spectra associated with said spectral data for each of a plurality of wavelengths;

a step for accessing said reference data to identify a reference slope-direction for each of said plurality of wavelengths; and a step for comparing each said slope-direction against each said reference slope-direction for each of said plurality of wavelengths.

44. The system as recited in claim 37, wherein said step for comparing said spectral data comprises:

a step for identifying a plurality of slope-directions of a spectra associated with said spectral data, each of said plurality of slope-directions being associated with a defined wavelength;

a step for accessing said reference data to identify a plurality of reference slope-directions, each of said plurality of reference slope-directions being associated with said defined wavelengths; and a step for comparing, for a first wavelength of said plurality of wavelengths, a first slope direction of said plurality of slope-directions against a first reference slope-direction of said plurality of reference slope-directions, wherein when said first slope-direction is different from said first reference slope-direction said object is not authentic.

45. The system as recited in claim 37, wherein said step for comparing said spectral data comprises a step for using one or more techniques selected from the group consisting of, spectral curve slope matching, color shift comparison, peak shift comparison, spectral curve fit technique, or combinations thereof.

46. The system as recited in claim 37, wherein said step for comparing said spectral data comprises a step for using techniques selected from the group consisting of reflectance ratio, max/min technique, or combinations thereof.

47. The system as recited in claim 37, wherein the interference security feature comprises a dichroic device.

* * * * *